Patented Nov. 24, 1953

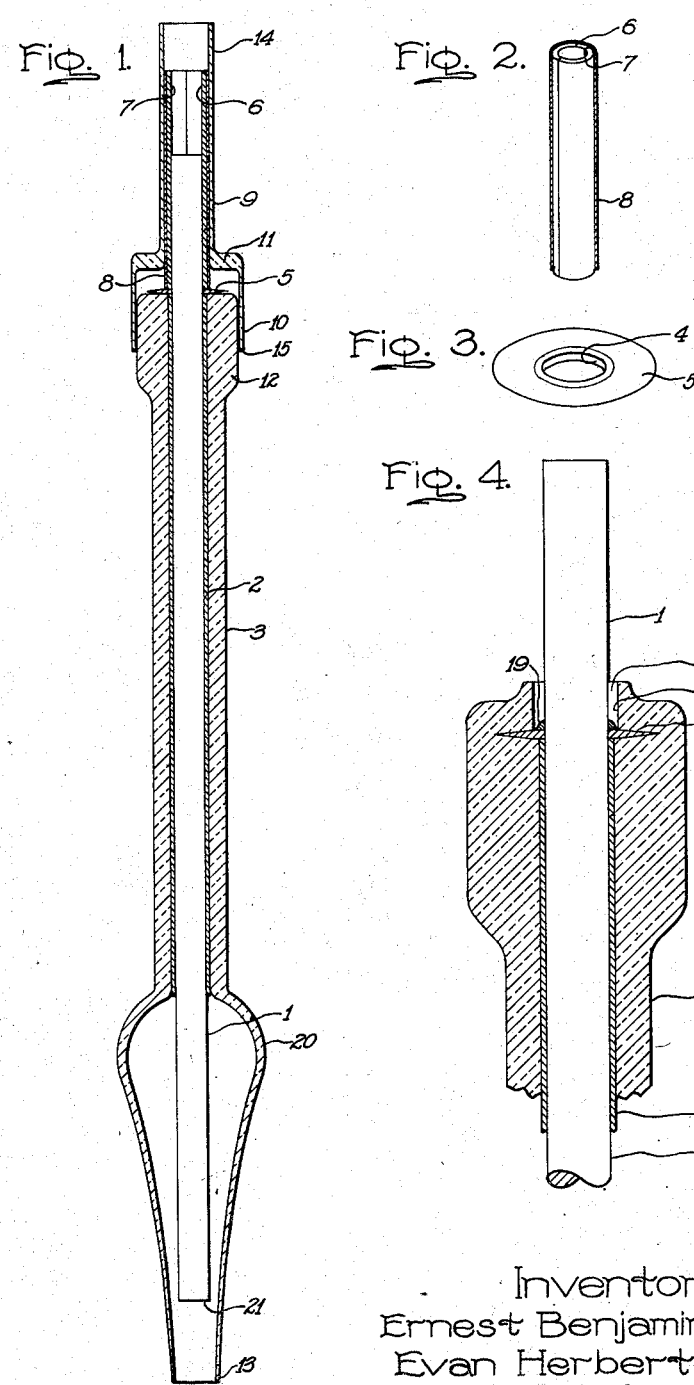

2,659,964

UNITED STATES PATENT OFFICE 2,659,964

METHOD OF MAKING QUARTZ-TO-METAL SEALS

Ernest Benjamin Power, Kenton, and Evan Herbert Nelson, Harrow Weald, England, assignors to General Electric Company, a corporation of New York Application August 30, 1948, Serial No. 46,916

Claims priority, application Great Britain September 1, 1947

2 Claims. (Cl. 29—179.5)

This invention relates to seal bodies of the type wherein a conductor is hermetically sealed through a wall of vitreous material of low thermal expansion coefficient, such as quartz.

The invention relates also to electric discharge devices, and especially high pressure gas-filled or vapor-filled discharge lamps, having envelopes of low expansion vitreous material incorporating such seal bodies.

In seal bodies of the type specified it is often desirable that the conductor should be a stout body, for example, a rod, of tungsten, and in British application No. 21,938/47 a seal body is described in which a stout tungsten conductor passes through an aperture in a thin molybdenum sheet which is hermetically joined to and around the tungsten conductor by the use as a solder or brazing medium of metal which unites both with molybdenum and with tungsten on heating, and part of the molybdenum sheet is embedded in vitreous material which forms the wall through which the tungsten conductor is thereby hermetically sealed.

Seal bodies of this kind can be made with stout conductors other than tungsten, for example, with molybdenum conductors, and with thin sheets other than molybdenum, for example, with tantalum sheets, the soldering or brazing metal used being such as to unite both with the metal of the sheet and with the metal of the stout conductor on heating.

Here it may be noted that the terms "solder" and "brazing medium" are often used synonymously and in this specification both terms are used in order to make it clear that no limitations are implied on the composition of suitable metals for joining the conductor and sheet, and that the metal may or may not melt during the heating.

In the method of making such a body, which is described by way of example in British application No. 21,938/47, the molybdenum sheet is first joined to and around the tungsten conductor and the edges of the molybdenum sheet are thereafter embedded in the vitreous material. We have now found it preferable to reverse this order of operation to reduce the possibility of the soldered or brazed joint being damaged by heat in the embedding of the molybdenum disc.

According to the present invention, therefore, in the manufacture of a seal body of the kind described in British application No. 21,938/47, part of the thin sheet is first embedded in the vitreous material and the stout conductor is thereafter soldered or brazed to the sheet to complete the seal.

Preferably the stout conductor is held within a first tube of the vitreous material so that one end of the conductor projects through a hole in the thin disc which abuts against the end of the tube, which end may be flanged. A second tube of the vitreous material, of appreciably greater diameter than the conductor, is then placed over the projecting end of the conductor and the opposed ends of the two tubes, which are shaped to fit for the sealing, are united by heating so as to embed the edge of the thin disc, but so that the second tube does not collapse onto the conductor. The soldering or brazing metal is then applied to the disc through the annular space between the conductor and the inner wall of the second tube, which may be cut off short to facilitate the introduction of the metal. The metal is preferably applied in solid form, the soldering or brazing being effected by subsequent heating of the body, but in some cases the metal may be introduced in molten form.

In the drawing accompanying and forming part of this specification a species of the invention is shown in which Fig. 1 is an elevational, partly sectional, view of the component parts of the seal partly assembled; Fig. 2 is a perspective view of a pair of shoes in assembled relationship and shown in section in Fig. 1; Fig. 3 is a similar view on an enlarged scale of an annular disc shown in section in Fig. 1; and Fig. 4 is an elevational, partly sectional, view on an enlarged scale of one end of a completed seal body.

In the method of making the seal body in the form of a lamp stem for a high pressure mercury vapor discharge lamp having a quartz envelope in accordance with the present invention, part of the length of a molybdenum rod 1, which part is wrapped in molybdenum foil 2, is inserted into the end of a first quartz tube 3, in which it is a close fit. The rod 1 passes through the central hole 4 of a sealing member in the form of a thin annular molybdenum disc 5 (Fig. 3) which abuts against the flat end of the tube 3 and is etched to a feather-edge around its periphery to form a sealing edge.

Over the projecting surface of the rod 1, and extending to the face of the disc 5, are fitted a pair of semi-cylindrical spacing shoes 6 and 7 (Fig. 2) which make up a longitudinally split sleeve and the shoes are then wrapped with molybdenum foil 8. Over the rod 1 and shoes 6 and 7 is placed a second quartz tube 9, expanded at its end into the shape of a thin-walled cup 10 with a thickened base 11 so that the flat inner surface of the base 11 of the cup 10 abuts against the molybdenum disc 5 and the walls of the cup 10 fit closely around the outer surface of the thicker walled end 12 of the first quartz tube 3. The tube 9 is shown raised slightly in Fig. 1 for clarity of illustration.

An inert gas such as nitrogen is supplied into the two tubes 3 and 9 from their outer ends 13 and 14, respectively, and the edge 15 of the quartz cup 10 is then heated by gas flames and sealed to the side of the end 12 of the first quartz tube 3 to form a chamber.

The opposed ends of the two quartz tubes 3 and 9 are then heated, while a vacuum is maintained within the tubes, so that the quartz collapses onto and embeds the sealing edge of the molybdenum disc 5 to make a gas-tight joint therewith. The quartz should be collapsed onto as much of the disc 5 as practicable to reduce the risk of the disc tearing under thermal expansion stresses. In general, the second tube 9 will collapse also on at least the inner part of the spacing shoes 6 and 7. The part of quartz tube 3 around the foil wrapped part of rod 1 is then heated to collapse it onto the foil 2 to make a good mechanical but not a gas-tight joint between the tube 3 and the rod 1.

The second tube 9 is then cut away near the base 11 of the cup 10 and the shoes 6 and 7 withdrawn, leaving an annular space or opening 17 between the molybdenum conductor 1 and the inner wall 18 as shown in Fig. 4. Small pieces of solder or brazing metal are applied to the surface of the disc 5 exposed through the opening 17 and the body is then heated, preferably in a reducing or neutral atmosphere, until the solder or brazing metal melts and flows between the molybdenum annulus 5 and the conductor rod 1 to hermetically close the space therebetween and to form the soldered or brazed joint 19 on cooling.

The nature of the soldering or brazing metal will depend on the use to which the seal body is to be put and the temperature which the seal body will reach in operation of the device of which it is to form part. Thus, the metal must not be liable to chemical attack which might damage the seal and must not melt during operation of the device.

With seal bodies for use in high pressure mercury vapor discharge lamps we have found that the material known under the trade name "Sil-Fos" is suitable as a solder or brazing medium. This material is listed in "The Condensed Chemical Dictionary," third edition, published in 1942 by the Reinhold Publishing Corporation, 330 West 42nd Street, New York, New York, as an alloy including silver, copper and phosphorus with a silver content of 15 per cent.

The stem is completed by severing the bulge 20 on the end of the quartz tube 3 at about its maximum diameter to expose the end 21 of the rod 1 and to provide a flange on the tube 3 for fusing with the walls of an opening in a quartz envelope of a high pressure mercury vapor discharge lamp, for example, to hermetically close the said opening. An electrode of refractory metal, such as tungsten, may be mounted on said end 21 of the rod 1 after the bulge 20 has been severed and the excess quartz removed.

In a specific stem made in accordance with the invention and which successfully conducts 300 amperes continuously, the rod 1 had a diameter of 6 mm. and a length of approximately 23 cms., the disc was approximately 16 mm. in diameter, had a maximum thickness of 0.05 mm. around the opening 4 therein and tapered down to a thickness of 0.01 mm. at its periphery. The shoes 6 and 7 used in providing the opening 17 were 4½ cms. long and had a wall thickness of about 1 mm., and the foils 2 and 8 wrapped around the shoes and the rod 1 to prevent the quartz sticking thereto were about 0.0127 mm. in thickness.

What we claim as new and desire to secure by Letters Patent of the United States is:

1. The method of hermetically uniting a composite vitreous tube having a high softening temperature, a metallic conductor rod and a metallic sealing member subject to oxidation at the softening temperature of the said composite vitreous tube and having an opening for receiving said rod and a sealing edge which comprises the steps of positioning said rod and said member within a pair of aligned vitreous tubes having their ends juxtaposed with the sealing member between the juxtaposed ends of the tubes and around said rod and with a split sleeve around said rod and butting against said member, creating a non-oxidizing atmosphere in said tubes, heating the juxtaposed end portions of said tubes around the sealing edge of said member to soften and collapse said tube portions thereon to hermetically unite said tubes and said member and to form a composite tube, removing part of the composite tube from around said sleeve and then removing said sleeve to give access to the joint between said rod and said member, and then brazing said joint to hermetically unite said rod and said member whereby the brazed joint between said rod and said member is not subjected to the heat incident to uniting said sealing edge and said tube portion.

2. The method of making a stem for a lamp envelope which comprises the steps of inserting one end of a metal rod wrapped with metal foil into a closely fitting vitreous tube having a thickened wall at one end, positioning around the rod and against the said tube end an annular metallic disc having a sealing edge, also positioning around the rod and against the said disc a split sleeve wrapped with metal foil, placing around the sleeve a second vitreous tube having a cup-shaped end fitting around the thickened end of the first tube with the base of the cup butting against the disc, creating a non-oxidizing atmosphere in said overlapping tubes and heating their overlapping portion to fuse them together, evacuating the space defined by the joined tubes, heating the vitreous material around the disc to soften and hermetically join said material thereto and then heating the part of the tube around the rod to soften and collapse it onto the foil, removing part of the tubing around the sleeve and removing the sleeve to give access to the joint between the rod and the disc, and then brazing said joint to hermetically unite said rod and said disc whereby the brazed joint between said rod and said disc is not subjected to the heat incident to the softening of the joined tubes.

ERNEST BENJAMIN POWER.
EVAN HERBERT NELSON.

(References on following page.)

References Cited in the file of this patent

UNITED STATES PATENTS

| Number | Name | Date |
|---|---|---|
| 893,473 | Fries | July 14, 1908 |
| 1,271,245 | Von Recklinghausen | July 2, 1918 |
| 1,293,441 | Houskeeper | Feb. 4, 1919 |
| 1,722,016 | Ronci | July 23, 1929 |
| 2,163,409 | Pulfrich | June 20, 1939 |
| 2,177,702 | Francis | Oct. 31, 1939 |
| 2,244,960 | Nelson | June 10, 1941 |
| 2,267,318 | Aicher | Dec. 23, 1941 |
| 2,291,660 | Spencer | Aug. 4, 1942 |
| 2,292,863 | Beggs | Aug. 11, 1942 |
| 2,387,903 | Hensel | Oct. 30, 1945 |
| 2,409,361 | Kettlewell | Oct. 15, 1946 |
| 2,488,285 | Gingrich | Nov. 15, 1949 |
| 2,492,162 | Litton | Dec. 27, 1949 |
| 2,504,521 | Greiner | Apr. 18, 1950 |